(12) United States Patent
Boot

(10) Patent No.: US 7,963,726 B2
(45) Date of Patent: Jun. 21, 2011

(54) PLASTIC ROCK-BOLT OR DOWEL

(76) Inventor: Phillip Hanford Boot, Wahroonga (AU)

(*) Notice: Subject to any disclaimer, the term of this patent is extended or adjusted under 35 U.S.C. 154(b) by 429 days.

(21) Appl. No.: 11/524,767

(22) Filed: Sep. 21, 2006

(65) Prior Publication Data
US 2007/0292231 A1 Dec. 20, 2007

(30) Foreign Application Priority Data

May 23, 2006 (AU) ................................ 2006202175

(51) Int. Cl.
*E21D 20/02* (2006.01)
(52) U.S. Cl. ..................................... 405/259.1; 411/413
(58) Field of Classification Search .... 405/259.1–259.6; 411/413, 82, 82.3
See application file for complete search history.

(56) References Cited

U.S. PATENT DOCUMENTS

| 647,235 | A | * | 4/1900 | Sault | 411/245 |
| 4,531,861 | A | * | 7/1985 | Kash | 405/259.6 |
| 4,904,122 | A | * | 2/1990 | Herbst et al. | 405/259.1 |

* cited by examiner

*Primary Examiner* — Sunil Singh
(74) *Attorney, Agent, or Firm* — Michael J. Striker

(57) ABSTRACT

A rock-dowel has a dowel shank and a threaded end at the head or proximal end of the dowel. Three groups of projecting mixing vanes are spaced along the shank. In use when inserted into a pre-drilled hole containing a two-part encapsulating resin and spun, the rock-dowel can thoroughly mix the two part resin encapsulating resin and force the resin casings into the back of the pre-drilled hole. Also disclosed is a nut made from a plastics material defining a first, typically relatively wider, barrel portion and a second, typically relatively narrower, nut portion, the second portion defining a nut section for engagement with a socket, wherein an area of weakness is provided between the first and second portions such that the second portion breaks from the first portion when a particular torque value is applied to the nut.

18 Claims, 6 Drawing Sheets

PLASTIC ROCK-BOLT OR DOWEL

FIELD OF THE INVENTION

The present invention relates to a plastic rock-bolt or rock-dowel for use in the reinforcement of earth strata, such as in underground mining and tunneling in coal mines. In a particular aspect, the invention is concerned with the combined action of fibre reinforced plastic bolts or dowels and fibre reinforced plastic nuts as a system to ensure quality of the installation and performance of the reinforcement and also to protect the plastic bolts or dowels from damage during installation, and for the duration of the dowels reinforcing life.

BACKGROUND OF THE INVENTION

Rock-bolts are used in mining, tunneling, and in general stabilization. One use of rock-bolts is in the coal mining industry where underground roadways or tunnels are excavated to facilitate the main mining operation. The tunnels have to be reinforced for safety reasons. Traditionally this has been done with steel rods called rock-bolts or rock-dowels. Such reinforcement may be of a permanent or temporary nature, and where the reinforcement is of a temporary nature, the reinforced strata may be subsequently excavated/mined.

However, when a steel rock-bolt is used to reinforce this part of the strata, expensive damage can occur to the excavating equipment used in the later excavation and also to equipment used in conveying the excavated material.

Because of this problem with steel rock-bolts, fibre reinforced composites (FRP) rock-bolts have become popular, particularly for temporary applications. Such materials have lower shear strength characteristics than steel and will not tend to damage the excavating or conveying equipment. FRP rock-bolts are also used in other applications such a "soil nailing" where the bolts, when used for temporary purposes, can be easily broken or cut up and removed at a later date when or if required.

In coal mining, the use of fibre reinforced dowels or bolts is limited to the mining or "later to be excavated" side of the access tunnel (called ribs) or what is commonly called the "cuttable" side. Steel rock-dowels are usually used in the other non "cuttable" side and the roof of the access tunnel.

A typical rock bolt or dowel used in coal mines is usually a rod of 20 mm-22 mm diameter and varying length from 900 mm-1800 mm, which is inserted in a pre-drilled hole of approximately 28 mm diameter and encapsulated in a binding cementitious material, usually a resin material.

In many cases, the rod has a threaded end that projects out of the hole where a washer and nut are attached to the rod. After encapsulation, the nut is tightened down to exert a pressure on the strata surface.

The sequence of dowel installation is, firstly a hole is drilled in the strata to the required depth, the drill bit is then removed from the drill chuck and replaced by a socket spanner. A two part resin binding agent contained in a flexible capsule of varying length is inserted into the hole. The capsule keeps the two components separate. Then the dowel, including a plate and a nut partially screwed onto the threaded end is partly inserted into the hole.

The nut is engaged by the drill chuck and spun vigorously whilst being pushed further into the hole, thus breaking the capsule and mixing the two resins together. The nut has a cap which prevents it from being screwed further down the dowel thread during the spinning operation, the dowel is then held motionless for a number of seconds whilst the, now mixed, resin solidifies.

When the resin is hardened the nut is turned further down on the now rigidly held encapsulated dowel which breaks out a cap on the end of the dowel at a pre-determined torque value and allows the nut to be tightened, creating force on the washer plate and strata surface until the desired torque value is attained. This value is determined by the skill of the drill rig operator.

The torque value is usually accomplished by guesswork which can be quite difficult as working conditions are usually tricky. Mines tend to be poorly lit and the equipment is robust and very strong. Typically, the operator cannot see if he has damaged the dowel by over tightening of the nut, nor can he tell if the encapsulation is adequate or successful.

In many cases, the machines that excavate the access tunnel also install the reinforcement dowels at the same time. These machines have drilling rigs positioned on the back of the machine and the sides and the roof of the tunnel are reinforced with dowels as the tunnel forming machine advances.

The drilling rigs are operated hydraulically and are basically designed to install steel rock-dowels. Thus, when installing the FRP dowels on the "cuttable" side, a problem arises due to the high torque performance of the drill rig required for the steel dowels and the low torque values of the FRP dowels.

The strength of the installation drill rig and the significant difference in shear and torque values between steel and FRP dowels, results in the FRP dowel being easily damaged unless the operator is experienced, skilled and very careful. In extreme cases the head of the dowel is twisted off.

Some mines have "automatic bolters" mounted on the tunneling machine, which cannot be used effectively with FRP dowels because of the difference in torque values between steel and FRP dowels.

Because the FRP dowel is not visible to the operator, it can be damaged without the operator's knowledge. In the past, damaged FRP dowels have caused walls to collapse resulting in severe injuries to mining personnel. These incidents have prompted officially written safety warnings by State mining authorities concerning the use of fibreglass or composite dowels.

To overcome this problem some FRP dowel manufacturers have developed what is known as a "thrust" dowel. This type of dowel has an enlarged nut shaped head but has no thread to exert force onto the strata surface. The installation drill rig simply pushes the head of the dowel hard into the hole until the encapsulating binder solidifies.

However, when using a thrust dowel the operator cannot tell if there is sufficient load onto the strata or more importantly if the encapsulation has worked satisfactorily, which is critical for the safety of mining personnel. Hence there are safety issues with the use of thrust dowels.

One additional problem with using a threaded end FRP rock-dowel, is that when the nut is tightened, the threaded end will project into the tunnel where there is typically constant traffic. The tunnels are relatively cramped. This can result in vehicles bumping or hitting the projecting end and damaging the dowel head and shank.

Although the use of a thrust dowel overcomes the problem of vehicular damage to the projecting FRP bolt, the performance of thrust dowels is significantly inferior to a threaded dowel in that the force applied to the strata surface is less than one third to that of the threaded dowel.

In addition the use of thrust dowels does not overcome one of the main causes of strata failure in the first place, being the poor encapsulation of the dowel within the pre-drilled hole. There are a number of separate issues which may lead to encapsulation failure. Such encapsulation failures are not apparent to the dowel installation operator and therefore can lead to significant personnel safety issues.

The encapsulation failure issues include the encapsulating resin not being mixed thoroughly and therefore not developing enough strength. Another failure issue arises where the encapsulating resin is insufficient in volume to bond enough of the dowel length. This allows the strata material between the dowel head and the end of the encapsulation to fall away.

The two part resin is divided into two separate casings. If the spinning dowel does not break both casings, the resins cannot be mixed. The dowel must be designed to ensure that both casings are broken open. Failure occurs where this does not happen.

As the spinning dowel is pushed further into the hole, it must force the broken resin casings down into the bottom of the hole. If it fails to do this, the casing becomes wrapped around the spinning dowel again causing the bonding between the resin, strata and the dowel to fail. This is a very common type of failure, known in the art as "gloving".

The failure of mining personnel to be aware of the above potential causes of failure during and after dowel installation, means that the strata may not be adequately reinforced. This is potentially dangerous and a known health hazard.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first broad aspect, the present invention provides a plastic rock dowel for use in reinforcing strata or the like having a generally cylindrical shank, the shank defining a tip portion and wherein a first group of spaced apart mixing vanes which project at least 1.5 mm and preferably no more than 5 mm from the shank are defined at or adjacent to a tip portion of the shank.

In use when inserted into a pre-drilled hole containing a two-part encapsulating resin and spun, the rock dowel can thoroughly mix the two part encapsulating resin and forces the resin casings into the back of the pre-drilled hole.

The head portion of the shank preferably has a larger diameter than the tip portion, excluding the vanes. To achieve this the shank may be tapered. Alternatively or in addition, the shank may include one or more stepped changes in diameter.

In a preferred embodiment, a second group of vanes which project from the shank by a lesser degree than the first group, are defined in a central portion of the shank spaced from the first group.

It is also preferred that a third group of vanes which project from the shank by a lesser degree than the second group, are defined adjacent a head portion of the shank spaced from the second group.

Typically, the first vanes project from diametrically opposed sides of the shank and are offset relative to one another along the longitudinal axis of the shank and are separated by diametrically opposed longitudinally extending planar portions of the shank which do not define projections.

In particular, in use, the vanes at the tip and along the shank mix the resin together after the two part resin capsule breaks and additionally forces the resin casings into the back of the pre-drilled hole.

In a preferred embodiment, the vanes on one of the diametrically opposed sides of the shank are part-helical the vanes on one side having left hand thread, and the vanes on the opposite side having a right hand thread.

The plastic rock dowel deformations or special projections are designed to mix the resin in three stages, the first stage is at the tip of the dowel and these projections are the largest and designed to not only mix the two resins but create a very large "spin diameter" within the pre-drilled hole so that the spinning dowel is presenting to the resin capsule a much larger diameter enabling the two separate capsule casings to be broken.

Relative to a hole having a diameter into which the dowel is to be inserted, the spin diameter area of the first group of vanes generated by revolving the shank through 360° about its longitudinal axis is preferably from 60 to 85% of the diameter of the hole.

The spin diameter of the vanes increases the effective spin diameter of the dowel shank by between 15 and 50%.

The large spin diameter then forces the now broken capsule casings down into the back or bottom of the hole whilst still allowing the mixed resin to travel up the shank of the dowel towards the dowel head and encapsulate the dowel.

As the mixed resin travels up the dowel shank the second and third stage projections further mix and agitate the resin material creating particle friction and accelerating the exothermic reaction occurring in the encapsulating resin.

It is preferred but not essential that the complete rock dowel be manufactured from reinforced plastic in one single moulding operation and that the plastic is a thermoset and the reinforcing is a continuous glass fibre.

The rock-dowel reinforcing system is also provided with a specially manufactured glass reinforced plastic (FRP) nut that in part shears off when a certain torque value is reached, this value is less than the torque value of the FRP dowel, thus preventing damage to the dowel during the installation procedure.

In particular the invention provides a combination of a rock dowel as described above and a nut made from a plastics material defining a first, typically relatively wider, barrel portion and a second, typically relatively narrower, nut portion, the second portion defining a nut section for engagement with a socket, wherein an area of weakness is provided between the first and second portions such that the second portion breaks from the first portion when a particular torque value is applied to the nut.

When the required torque value is reached the rear hexagon shaped part of the nut held in the drill chuck socket shears off and preferably disintegrates leaving the structural barrel of the nut in place.

The front barrel shaped section is either larger in diameter or so configured that the socket used to torque up the hexagon shaped nut section cannot engage it during the installation operation.

The nut is preferably manufactured in one operation by injection moulding means preferably from a glass reinforced thermoplastic material, the nut will have an internal thread formed inside it to match the thread section of the rock-dowel.

The nut will also have a "break out" cap at the hexagon shaped end or midway at the junction of the barrel and the hexagon sections, this cap is designed to break out during the installation phase after the encapsulation binder solidifies. During the injection moulding process holes or apertures are formed into the nut at the junction of the barrel and the hexagon sections in what is called a "core pulling" or "slide" operation.

The core pulling operation operates at least two slides transverse to the length of the nut and must be retracted as these parts of the nut moulding die must retract before further de-moulding of the nut is undertaken. The dimensions of these apertures is variable and controls the shear value of the parting of the two nut sections.

The desired torque value of the shear of the two nut sections can vary with the ultimate torque value of the dowel, for example, for a 20 mm diameter fibreglass dowel the shear value is approximately 55 ftlbs-110 ftlbs. A 22 mm diameter dowel has a higher ultimate torque value and would range between 75 ftlbs-150 ftlbs.

The torque value for the nut can also vary with the type of resin used in the dowel and also the design and quantity and quality of reinforcement used to manufacture the dowel. This means that the nut shear torque value can range from 55 ftlbs-145 ftlbs.

At the lower torque shear values it was found that a simple groove formed between the two nut sections that determines the shear value was reduced to a 0.6-1 mm wall thickness.

When using a glass fibre reinforced thermoplastic to injection mould the nut, the glass fibre length is around 400 microns or 0.4 mm at a fibre content level of between 30%-50%. The speed and high injection pressure used in the process to mould the nut causes the fibre contained in the now liquid resin to shear and break up when forced through these small narrow section thicknesses. This causes the fibre content and reinforcing performance to become uneven and result in an unreliable shear value for the separation of the two nut sections.

To overcome this problem and make the shear value consistent, apertures may be moulded into the weakened portion between the nut and barrel sections so that a series of columns of more even sections were formed, these column type sections snap or shear off separating the nut and barrel sections reliably at the desired shear value as the glass fibres contained in the plastic is evenly distributed The structural action of concentrating stress in designated areas of the separation region causes the separation process to be quite different.

When the rear hexagonal nut section is sheared off, the thread inside that section must break up and not act as a lock nut, preferably this part disintegrates into small pieces and falls from the drill chuck socket. In some cases to facilitate the disintegration process the hexagon section around this part of the thread is also reduced in strength during the moulding operation.

It is not essential that the rear hexagon shaped part of the nut has an internal thread as long as the internal diameter is larger than the diameter of the threaded section, however it may be important that the rear hexagon section of the nut does in fact shatter and disintegrate or at least freely separates from the chuck. The reason for this is so that it does not get caught in the drill chuck socket necessitating the installation operator to clear the socket out.

The disintegration of the hexagon section is caused by different recesses formed into the flat sections of the hexagon sections, these recesses must not affect the shear value of the nut separation but may in some cases be formed integrally with the separation recesses during the moulding operation.

BRIEF DESCRIPTION OF THE DRAWINGS

A specific embodiment of the present invention will now be described by way of example only, and with reference to the accompanying drawings, in which:—

FIG. 1b in an elevation of one face "A" of the rock dowel of FIG. 1a.

FIG. 1c in an elevation of the opposite face "B" of the rock dowel of FIG. 1a.

DETAILED DESCRIPTION OF PREFERRED EMBODIMENTS

Figure 1:
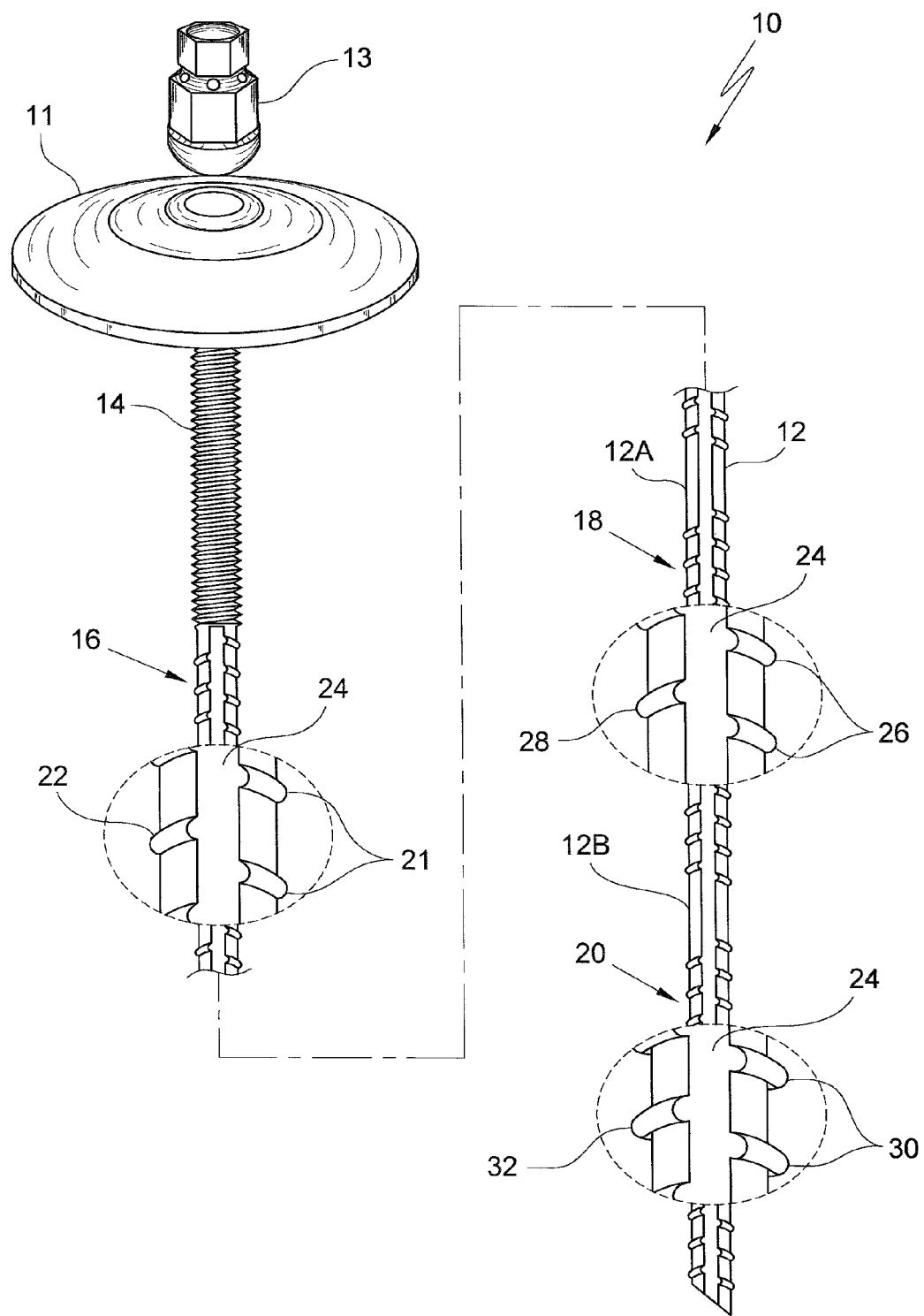
FIG. 1 is an elevation of a threaded plastic rock dowel with mixing vanes, a washer plate and a nut showing sections of the dowel enlarged.

Referring to the drawings, FIG. 1 shows one side of a fibre-reinforced plastic (FRP) rock dowel 10. A view of the rock dowel from the opposite side is substantially identical. The rock dowel has a dowel shank 12 having a diameter of about 20-22 mm, defining a longitudinal axis 100 (refer to FIG. 1a) and a threaded end 14 at the head or proximal end of the dowel. Three groups 16, 18 and 20 of projecting mixing vanes, a first group 20, a second group 18, and a third group 16 are spaced along the shank 12. Also shown in FIG. 1 is a washer plate 11 and a nut 13.

The vanes 21, 22 of the third group 16 of projecting mixing vanes adjacent the threaded portion 14, project approximately 0.5mm-1 mm out from the dowel shank 12, most preferably about 1 mm. Vanes 21, 22 extend out from opposed sides of the dowel shank separated by diametrically opposed flattened portions 24 of the shank, of which only one is shown. The vanes 21 extending from one side of the shank are offset from those extending from the opposite side of the shank.

Figure 1A:
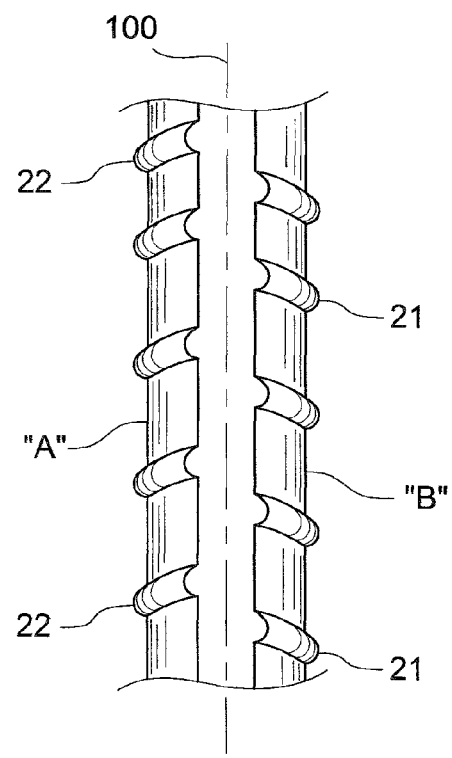
FIG. 1a is an enlarged view of a portion of the shank of the rock dowel shown in FIG. 1.
Figure 1B:
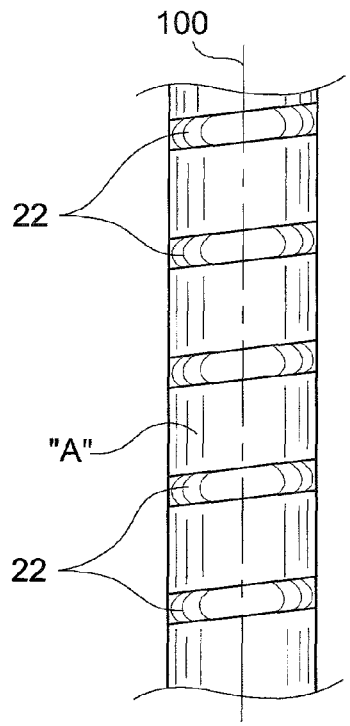
Figure 1C:
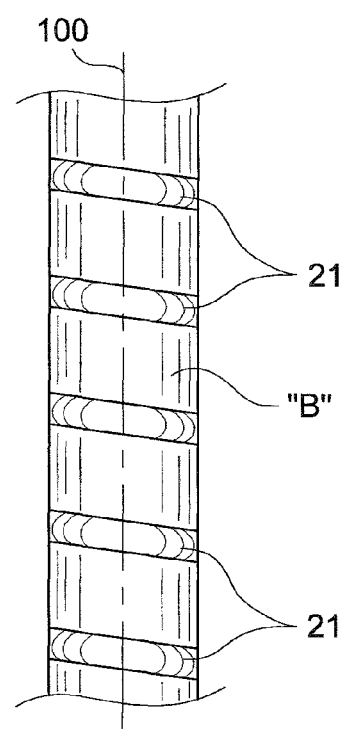

With reference to FIGS. 1a and 1c, it can be seen that the mixing vanes 22 on one side or face "A" of the shank are not perpendicular to the longitudinal axis but rather are part-helical/spiral having a left hand thread such as the shank is rotated in a clockwise sense about its longitudinal axis, the vanes 22 tends to push material towards the head of the shank. The mixing vanes 21 on the opposite face B of the shank are also part-helical/spiral but have a right hand thread such that as the shank is rotated in a clockwise sense about its longitudinal axis, the vanes 21 tend to push material towards the tip of the shank. Thus in use, as is described below, the vanes counteract each other.

There are approximately ten vanes extending from either side of the shaft in the third group 16, however the specific number of vanes is not critical and may be varied.

There is a gap 12a on the shank where there are no vanes followed by the second group of vanes 18. The configuration of the second group is largely the same as that of the third group 16, with vanes 26 and 28 being offset relative to one another and separated by opposed flattened portions 24. The length of the gap 12a is not critical. The size of the vanes 26, 28 is greater than those of the third group, projecting from about 1.5 to 2 mm from the shank. While there are approximately ten vanes extending from either side of the shaft in the second group, the specific number of vanes is not critical and may be varied.

There is a gap 12b on the shank where there are no vanes followed by the first and final group of vanes 20 located at the distal or tip of the shank. The configuration of the first group is largely the same as that of the third and second groups, with vanes 30 and 32 being offset relative to one another and separated by a flattened portions 24. The length of the gap 12b is again, not critical. The size of the vanes 30, 32 is greater than those of the second group, projecting from about 2.5 to 3 mm from the shank. The number of vanes in the first group should preferably be limited to between two and eight vanes on each side of the shank.

In all the groups 16, 18 and 20, the spacing between the vanes in each section can vary between 10 mm-30 mm, but is preferably about 20 mm.

Figure 2:
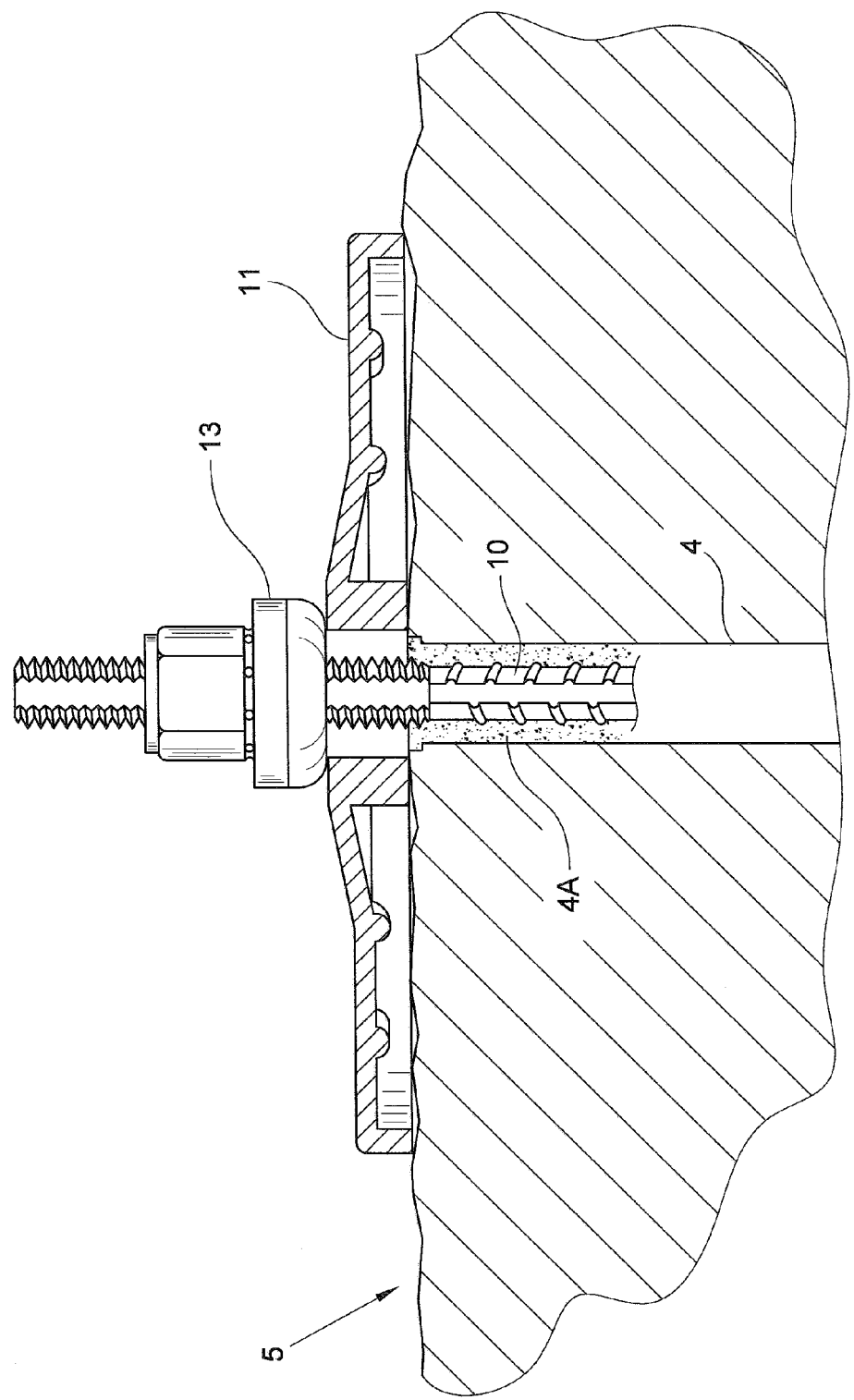
FIG. 2 is a section showing a typical rock-dowel, nut and plate assembled in a pre-drilled hole made in a coal strata.

In use, with reference to FIG. 2, a hole 4 is first drilled in the strata 5 where the rock-dowel 10 is to be installed, typically coal. Typically the hole 4 will have a diameter of approximately 28 mm however as coal is a friable material the diameter of the hole is unlikely to be consistent and the hole diameter may be as much as 32 mm depending on the size of the drill and the friability of the coal. A resin capsule 113 is then inserted in the drilled hole. The dowel is then partly inserted in the hole, spun and pushed further into the hole.

Figure 6:
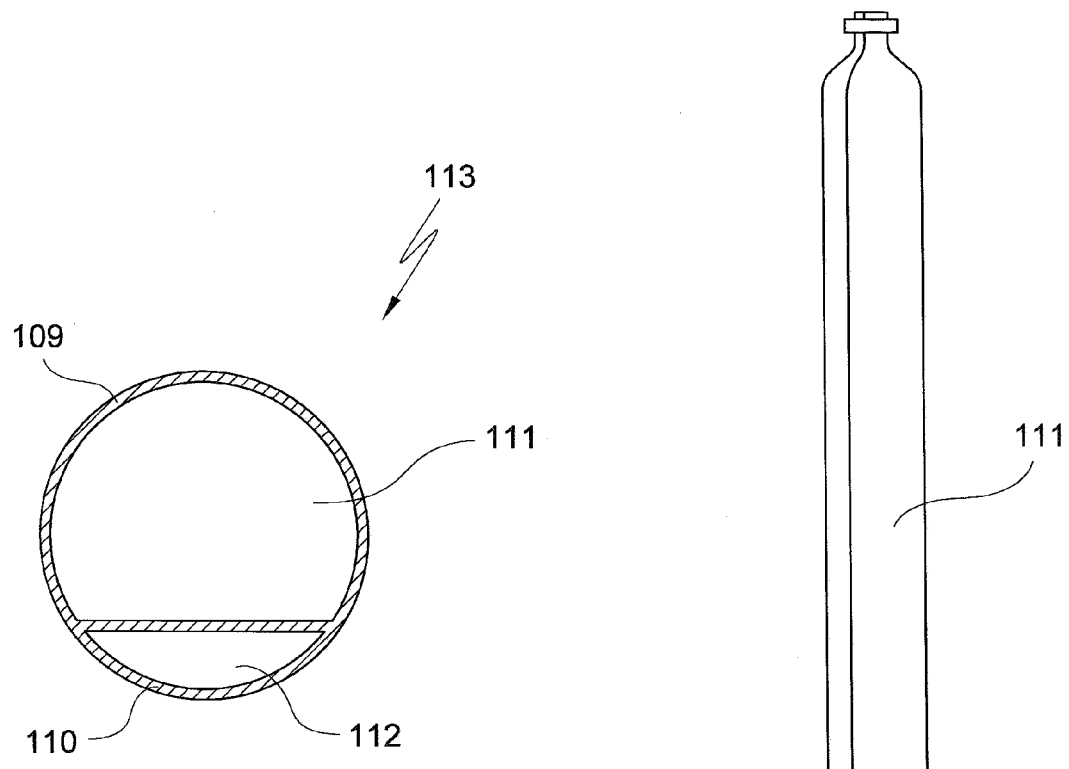
FIG. 6 is a plan view of the diameter of a resin capsule showing two separated resin compartments.
Figure 7:
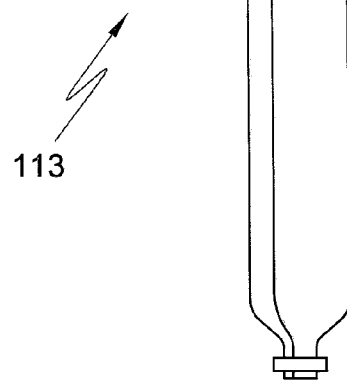
FIG. 7 is an elevation of a resin capsule also showing the two separated compartments.

FIGS. 6 and 7 show a typical resin capsule 113. These are typically approximately 24 mm in diameter having the two separate compartments 111 & 112. Compartment 111 is where the resin material is contained by casing 109 and consists of approximately 85% of the volume. Compartment 112 is where the catalyst (approximately 15% of volume) is contained in casing 110. When the catalyst in compartment 112 is mixed with the resin in compartment 111, an exothermic reaction occurs, causing the resin to harden.

During the dowel 2 spinning operation, both capsule compartments 111 and 112 must be broken open and fully mixed together.

The cross-sectional area of the resin compartment 111 is approximately 445 mm$^2$. The cross-sectional area of the smaller catalyst compartment 112 is only approximately 65 mm$^2$. With previous rock-dowels of the prior art, often a dowel will pierce the larger compartment 111 and miss the smaller catalyst compartment 112 partly or wholly, allowing the compartment 112 or casings 109 and 110 to wrap around the spinning dowel 2, failing to mix the resins 111 and 112 and causing "gloving."

In use the dowel 12 is inserted into the hole to pierce the capsules and is spun to mix the resin and catalyst.

With the rock-dowel 10 embodying the present invention, the vanes project out from the shank creating a larger effective spin diameter. In particular, the mixing vanes 30, 32 project out from the dowel shank by approximately 2.5 mm-3 mm creating a spin diameter of up to 6 mm larger than the diameter of the dowel shank 12. As the normal shank 12 diameter is 20 mm-22 mm the spin diameter is up to 26 mm-28 mm in a predrilled hole 4 of approximately 28 mm-32 mm depending on the drill diameter and strata condition of the coal strata. This improves the mixing and increases the chances of properly piercing and mixing both compartments.

While less critical than the end vanes 30 and 32, the vanes in the groups 18 and 20 also project from the dowel shank 12 and create a vigorous agitating and mixing environment.

As discussed above because the part-helical mixing vanes on opposite sides of the shank are opposite in sense, being left and right handed the vanes agitate the two part resin driving it back and forth in turn, without forcing the resin or the casings either into or out of the hole.

The annulus gap 4a, that is, the difference between the effective diameter of the spinning dowel 10 and the pre-drilled hole 4 diameter is dramatically reduced whilst still allowing room for the mixed but as yet unhardened resin 4a to travel up the dowel shank 12 towards the dowel head as the dowel is thrust deeper into the predrilled hole 4 displacing the mixed resin 4a, and without significantly increasing the volume of the shank 12. Increasing the volume of the shank would not only leave less room for the resin mixture to move but also increase the materials used to make the shank and consequently its cost.

To show how the spin diameter affects the performance of the encapsulation process, by mixing the resin 4a and preventing the ruptured resin capsule casings 109 and 110 from wrapping around the spinning dowel 2, the effect of larger spin diameters can be expressed in area values.

For example, a 28 mm diameter drilled hole 4 has a diameter area of 616 mm$^2$, a 20 mm diameter dowel has a diameter area of 314 mm or approximately 51% compared to the hole, this means that the "free area" not affected by the spinning dowel is 302 mm$^2$.

The same 20 mm diameter dowel with a 3 mm projection on both sides has a spin diameter of 26 mm and a spin diameter area of 513 mm with a "free area" not affected by the spinning dowel 10 of only 85 mm$^2$, a reduction of over 70% without enlarging the dowel shank diameter or increasing the effective dowel cost. The unaffected "free area" is reduced to approximately 14% of the diameter area of the drilled hole 4

The spin diameter area of the dowel 2 is the most critical element to achieve satisfactory encapsulation and should range between 60%-85% of the drilled hole diameter area. These percentages are not achievable without the mixing vanes 30, 32, as the diameter of the spinning dowel 2 becomes too large to allow the mixed resin 4a to transfer backwards towards the hole opening and encapsulate the dowel.

The spin diameter of the vanes increases the effective spin diameter of the dowel shank by between 15 and 50%.

By narrowing the annular gap 4a both resin casings 109 and 110 are broken and then thrust down into the back of the hole 4 by the spinning dowel 10 so that the casings 109 and 110 cannot wrap around the spinning dowel shank 12.

The dowel 10 shown in FIG. 1 is preferably manufactured in a one piece and in one single process. This is desirable for strength and cost reasons.

In a variant, a smaller shank diameter could be used but with larger vanes. For example with a shank diameter of 18 mm, the vanes 16 could project out from the dowel shank by 1.5 mm-2 mm, the vanes 18 could project by 2.5 mm-3 mm and the vanes 20 by 3.5 mm-4 mm.

During the spinning operation to assist in the migration of the mixed but as yet unhardened resin 4a up towards the dowel head the dowel shank 2a should be constrained in diameter and could even be tapered or stepped approximately 2 mm so that it has a smaller diameter at the dowel shank tip. This reduces back pressure in the hole 4 and on the unmixed resin 4a which, if allowed, can migrate into the fissures of the fractured coal material and cause a loss in bonding to the coal strata.

Figure 3:
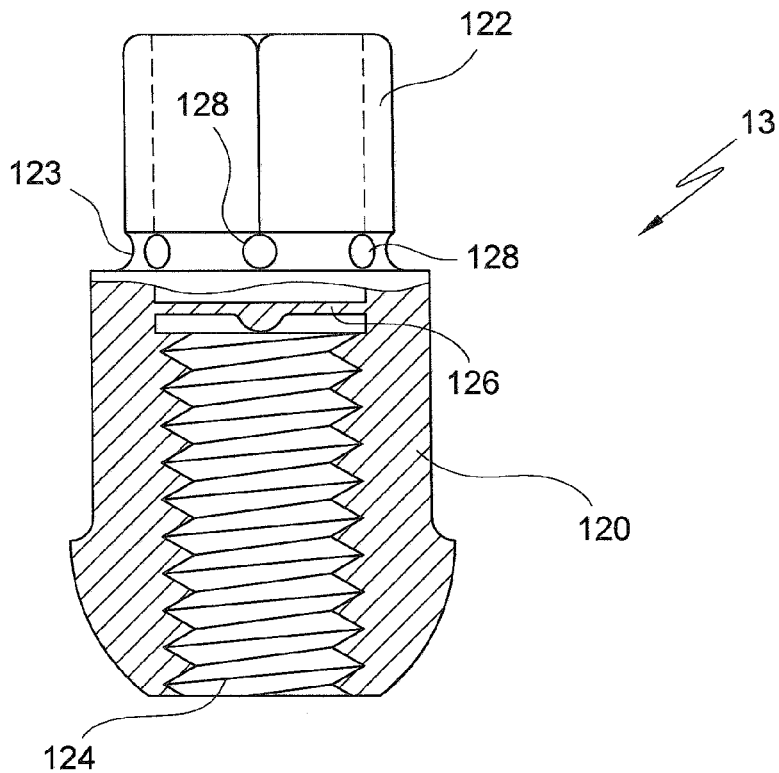
FIG. 3 is an elevation of a nut with the holes and columns moulded into the junction of the barrel and hexagon sections to facilitate separation of the two sections.

FIG. 3 shows the cooperating nut 13 in more detail. It includes a circular generally annular barrel section 120 connected to a co-axial hollow hexagonal section 122 by a recessed annular weakened portion 123. The hollow hexagonal section may or may not be internally threaded. The barrel section 120 has an internal thread 124. A breakout cap 126 that allows the dowel 10 to be spun during the spinning and mixing stage separates the interior of the barrel section 120 from the hexagonal section 122. This cap 126 will break out at a set torque level significantly less than the torque level required to shear the weakened portion 123 and separate the hexagon 122 and barrel 120. Also shown are apertures 128 in the weakened portion 123 and recesses 130 (refer to FIG. 4) which combine to allow the hexagon section 122 to separate from the barrel section 120 at the required torque value.

Figure 4:
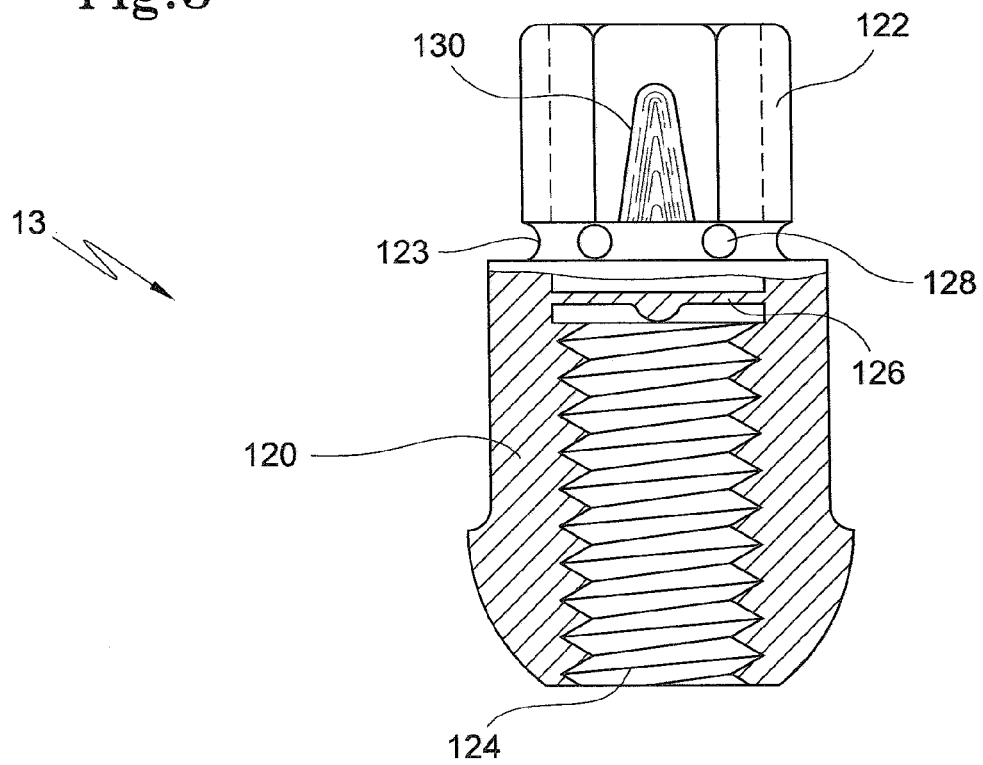
FIG. 4 is an elevation of a nut showing recesses moulded into the flats of a hexagonal section to facilitate the disintegration of the hexagonal section after separation from the barrel section.

The position of the breakout cap 126 as shown in FIGS. 3 and 4 is close to the junction 123 of the hexagon section 122 and the barrel section 120. This is preferable in that when these two sections part and the nut 13 is in the final position, the amount of projection of the threaded end 14 of the dowel will be as small as possible.

The lesser projection of the threaded portion 14 is particularly significant when the installation operator has used what is termed a "thrust" installation. In such an operation, immediately on completion of the dowel spinning stage, the dowel 10 is thrust hard against the washer plate 3 and strata surface 5 and held whilst the resin in the gap 4a is hardening. The nut 13 when finally tightened will only advance several threads and not project any further than approximately 25 mm out from the end of the barrel section 120 or project no more than the original position of the hexagon section 122 before it separates from the barrel 120.

The position of the cap 126 in the nut 13 may also be critical for other reasons. The size and configuration of the hexagonal section 122 is dictated in coal tunnels by the size of the steel nut used in the other non cuttable areas as the operators refuse to constantly keep changing the drill chuck socket to suit plastic nuts. Traditionally with both steel and plastic nuts the position of the cap has been at the very end of the hexagonal section 112 or at the top of the nut 13. The hexagonal size restriction has created a problem for plastic nuts in that to obtain a high cap breakout value the whole or part of the top of the hexagon breaks away with the cap yielding enormous variations and unreliable cap breakout values. By placing the cap in between the hexagon 122 and barrel section 120 as shown in FIGS. 3 and 4 the cap can be thickened for higher breakout values without affecting the hexagonal section 122.

FIG. 4 shows another view of the nut 13 showing recesses moulded into some of the flats of the hexagon section 122 to facilitate the disintegration or collapsing of the hexagon section 122 after it separates from the barrel section 120.

Figure 5:
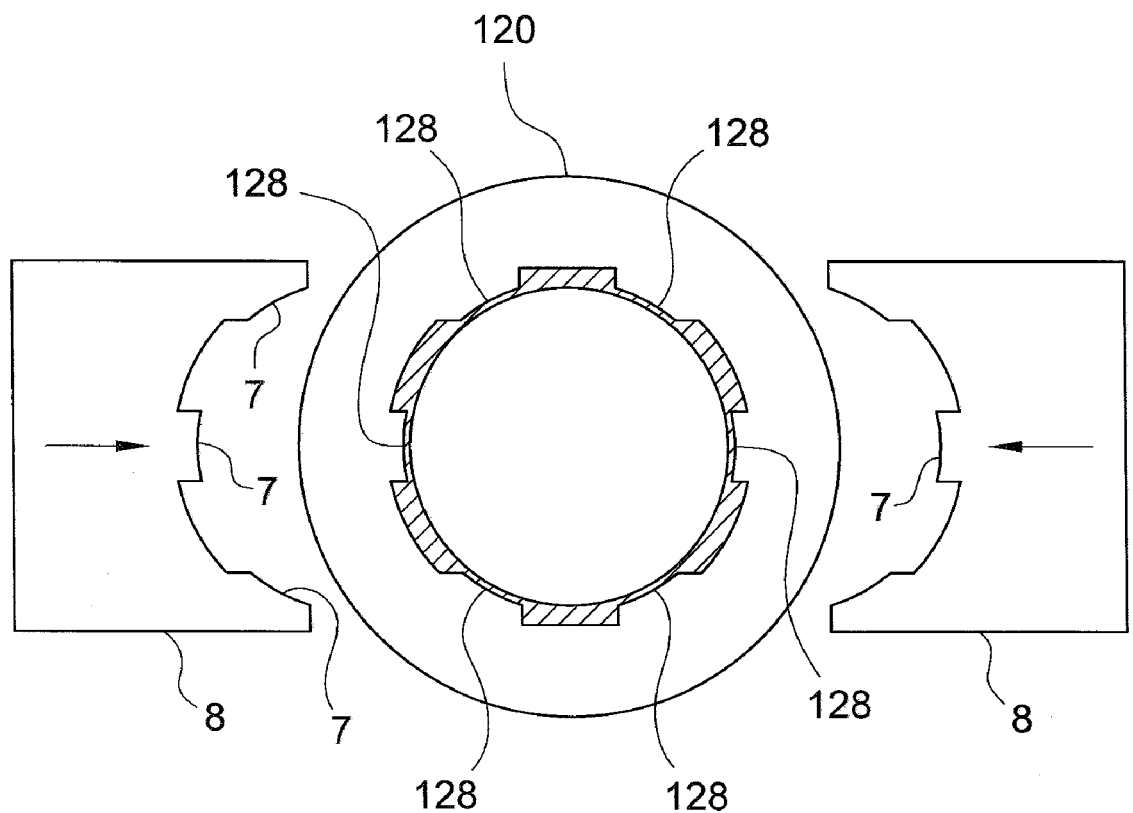
FIG. 5 is a plan view of the hexagon end of the nut showing the columns at the juncture of the barrel and hexagonal ends and the moulding slides to form the columns and holes.

FIG. 5 shows a plan view of the barrel section 120, the apertures 128 and the columns 130. Also shown is the method of forming the holes or apertures 128 and the columns 130 by horizontal slides 8 with projections 7 that form the apertures or holes. The apertures 128 do not have to actually penetrate the full section but preferably do penetrate enough to significantly weaken the section so it cannot add significantly to the torque value. The columns 130 may take any convenient configuration but should be approximately equal in shear strength for reliability.

The size of the apertures 128 will vary with the required torque value required which will vary with the diameter of the rock-dowel 10 and the ultimate strength of the dowel shank 12.

A significant feature and advantage of this reinforcing system is that if the encapsulation is faulty or insufficient the hexagon and barrel section will not separate. Instead the whole head of the dowel will shear off as the torque value of the dowel will be exceeded before the torque value of the separating barrel 120 and hexagon 122 sections is reached. The operators are thus instantly alerted to the dowel head and shank failure and must install another replacement dowel with a longer resin capsule to complete the reinforcement.

In this way the reinforcing system is fail safe in that operators no longer have to be too careful and tentative when tightening the nut and are confident that the dowel 10 is undamaged and a minimum force of approximately 2 tonnes-4 tonnes load is applied to the strata 5 surface. This system speeds up the installation operation and removes the remedial repair work required when the reinforcement system is not installed correctly and the strata 5 begins to collapses.

In FIG. 2 part of the dowel 10 is shown inserted into the pre-drilled hole 4 in the coal strata 5, the nut 13 goes through two separate stages. The first stage is the spinning operation. The second stage is cap 6 breakout and torque shear stage when the hexagon section 1b shears off.

The nut 1 in FIG. 2 is shown in between the first and the second stage of installation after the nut cap 6 (not shown) has been broken out and extended down the threaded section the dowel 2 is locked in by the encapsulation and hardened resin 4a.

The second stage of installation is the further tightening of the nut 1 down onto the plate 3 and strata surface 5. The section with holes or apertures 1a allows the hexagon shaped back of the nut 1b to shear off at a prescribed torque value. Sometimes there can be a steel or plastic mesh between the strata surface and the washer, this is to hold back coal from falling out from areas between the spacings of the dowel installation.

It will be appreciated by persons skilled in the art that numerous variations and/or modifications may be made to the invention as shown in the specific embodiments without departing from the spirit or scope of the invention as broadly described. The present embodiments are, therefore, to be considered in all aspects as illustrative and not restrictive.

The invention claimed is:

1. A plastic rock dowel for use in reinforcing strata or the like having a generally cylindrical shank, the shank having a diameter and defining a longitudinal axis, a head at one end and a tip portion at an opposite end, wherein a threaded portion is provided at the head for receiving a nut, and wherein a first group of spaced apart mixing vanes which project at least substantially 2.5 mm from the shank are defined at or adjacent to the tip portion of the shank the vanes increasing an effective spin diameter of the rock dowel by from 15 to 50% compared with the diameter of the shank, and wherein the first group of vanes comprise first and second opposed sets of vanes separated by longitudinally extending gaps with a first sets of vanes projecting from one side of the shank and a second set projecting from a diametrically opposed side of the shank and wherein the first and second sets of vanes are part-helical, the vanes of the first set having a generally left handed thread such that as the shank is rotated in a clockwise sense about its longitudinal axis the vanes tend to push material towards a head of the dowel and the vanes of the second set having a generally right handed thread such that as the shank is rotated in a clockwise sense about its longitudinal axis the vanes tend to push material towards a tip of the dowel.

2. The plastic rock dowel as claimed in claim 1 wherein a head portion of the shank has a larger diameter than the tip portion, excluding the vanes.

3. The plastic rock dowel as claimed in claim 1 wherein the shank is tapered.

4. The plastic rock dowel as claimed in claim 1 wherein the shank includes one or more stepped changes in diameter.

5. The plastic rock dowel as claimed in claim 1 wherein the first group of vanes are offset relative to one another along the longitudinal axis of the shank and wherein the longitudinally extending gaps do not define projections.

6. The plastic rock dowel as claimed in claim 5 wherein longitudinally extending portions of the shank are generally planar.

7. The plastic rock dowel as claimed in claim 1 wherein a second group of vanes which project from the shank by a lesser degree than the first group, are defined in a central portion of the shank spaced from the first group.

8. The plastic rock dowel as claimed in claim 7 wherein the second group of vanes project from the shank by at least 1.5 mm and preferably no more than 2 mm.

9. The plastic rock dowel as claimed in claim 8 wherein the second group of vanes project from the shank by no more than 2 mm.

10. The plastic rock dowel as claimed in claim 7 wherein a third group of vanes which project from the shank by a lesser degree than the second group, are defined adjacent a head portion of the shank spaced from the second group.

11. The plastic rock dowel as claimed in claim 10 wherein the third group of vanes project at least 0.5 mm from the shank and preferably no more than 1 mm.

12. The plastic rock dowel as claimed in claim 11 wherein the third group of vanes project from the shank no more than 1 mm.

13. The plastic rock dowel as claimed in claim 1 wherein the vanes in the first group project no more than 5 mm from the shank.

14. The plastic rock dowel as claimed in claim 1 wherein the dowel is manufactured in one piece from a fibre reinforced plastic and the diameter of the shank is from 18 to 22 mm.

15. The plastic rock dowel as claimed in claim 1 wherein relative to a hole having a diameter into which the dowel is to be inserted, the spin diameter area of the first group of vanes generated by revolving the shank through 360° about its longitudinal axis is from 60 to 85% of a diameter area of the hole.

16. The plastic rock dowel as claimed in claim 15 wherein the diameter of the hole is about 28 mm.

17. The plastic rock dowel as claimed in claim 1 wherein there are from two to eight vanes in the first group disposed on either side of the diametrically opposed longitudinally extending portions of the shank.

18. A plastic rock dowel for use in reinforcing strata or the like having a generally cylindrical shank, the shank having a diameter and defining a longitudinal axis, a head at one end and a tip portion at an opposite end, wherein a threaded portion is provided at the head for receiving a nut, and wherein a plurality of groups of spaced apart mixing vanes which project at least substantially 0.05 mm from the shank are defined on the shank the vanes increasing an effective spin diameter of the rock dowel by from 15 to 50% compared with the diameter of the shank, and wherein the groups of vanes are separated by longitudinally extending gaps, and each group of vanes comprise first and second opposed sets of vanes separated by longitudinally extending gaps with a first sets of vanes projecting from one side of the shank and a second set projecting from a diametrically opposed side of the shank and wherein the first and second sets of vanes of each group of vanes are part-helical, the vanes of the first set having a generally left handed thread such that as the shank is rotated in a clockwise sense about its longitudinal axis the vanes tend to push material towards a head of the dowel and the vanes of the second set having a generally right handed thread such that as the shank is rotated in a clockwise sense about its longitudinal axis the vanes tend to push material towards a tip of the dowel.

* * * * *